(12) United States Patent
Kawai et al.

(10) Patent No.: US 7,275,870 B2
(45) Date of Patent: Oct. 2, 2007

(54) AIR BEARING STRUCTURE AND LINEAR DRIVING DEVICE USING SAID AIR BEARING STRUCTURE

(75) Inventors: Tomohiko Kawai, Yamanashi (JP); Kenzo Ebihara, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 182 days.

(21) Appl. No.: 11/188,798

(22) Filed: Jul. 26, 2005

(65) Prior Publication Data
US 2006/0018571 A1   Jan. 26, 2006

(30) Foreign Application Priority Data
Jul. 26, 2004 (JP) ............................. 2004-217341

(51) Int. Cl.
*F16C 32/06* (2006.01)
(52) U.S. Cl. ........................................ 384/12
(58) Field of Classification Search ............ 384/8, 384/9, 12
See application file for complete search history.

(56) References Cited

U.S. PATENT DOCUMENTS

| 4,606,587 | A | * | 8/1986 | Thompson | .................... | 384/12 |
| 4,704,712 | A | * | 11/1987 | Siryj | .............................. | 384/8 |
| 4,749,283 | A | * | 6/1988 | Yokomatsu et al. | .......... | 384/12 |
| 6,491,435 | B1 | * | 12/2002 | Nishikawa et al. | ........... | 384/12 |
| 6,644,855 | B2 | * | 11/2003 | Sakino et al. | ................... | 384/9 |
| 2002/0181808 | A1 | * | 12/2002 | Tsuda et al. | .................. | 384/12 |

* cited by examiner

*Primary Examiner*—Thomas R. Hannon
(74) *Attorney, Agent, or Firm*—Staas & Halsey LLP

(57) ABSTRACT

The length of the bearing surface in the movable portion which moves linearly is larger than the length of the bearing surface in the fixed portion by the stroke of the movement. With this configuration, the bearing surface on the side of the fixed portion always opposes the bearing surface on the side of the movable portion. An air supply source is connected to the fixed portion, and a plurality of air discharge openings through which air is injected are disposed in the bearing surface of the fixed portion to constitute an air bearing. Only the side of the movable portion where the fixed portion is inserted is open. A coil is disposed on the fixed portion and a magnet is disposed on the movable portion so that a linear motor is constituted, thus providing a linear driving device. Cables and the like for supplying compressed air or power are connected to the fixed portion, not to the movable portion, thus no external pressure is applied from the cable and the like, and highly accurate operation is achieved.

5 Claims, 4 Drawing Sheets

AIR BEARING STRUCTURE AND LINEAR DRIVING DEVICE USING SAID AIR BEARING STRUCTURE

BACKGROUND OF THE INVENTION

1. Field of the Invention

The present invention relates to an air bearing structure and a linear driving device which is integrally formed with the air bearing structure.

2. Description of the Prior Art

In devices such as super precision processing devices which require positioning precision in nanometer order, an air bearing is used in order to eliminate friction during movement of the movable portions. Using the air bearing allows very high precision operations to be realized. However because the air is in the form of compressed liquid, the bearing rigidity deteriorates by one digit or more compared to that of the oil bearing or the rotor bearing.

In an air bearing, compressed air is supplied between bearing surface at the fixed portion side and the bearing surface at the movable portion side so that the movable part is supported by the pressure of this air. In the case of the air bearing in particular, in which the movable portion moves in a linear direction with respect to the fixed portion, the area of bearing surface on the side of the fixed portion, which opposes the bearing surface on the side of the movable portion, changes in accordance with the movement in the linear direction of the movable portion. As a result, if an air discharge opening such as a nozzle or the like is provided on the side of the fixed portion and air is supplied from the fixed portion side, the air from the air discharge opening that is formed in the area of the bearing surface on the side of the fixed portion which does not oppose the bearing surface on the side of the movable portion, is released into the atmosphere and the air pressure between the bearing surfaces is reduced. As a result in the prior art, in the case of the air bearing in which the movable portion moves in the linear direction with respect to the fixed portion, air supply is carried out from the movable portion side.

The prior art example of an air bearing in which air is supplied from the movable portion side and the movable portion moves linearly with respect to the fixed portion is described in the following using FIG. 2A to FIG. 2E.

As shown in FIG. 2B, the fixed portion 11 has a substantially square pillar shape, and the bottom surface thereof is fixed to the surface of the base 13, and extends upward from the surface of the base 13. All of the 4 surfaces of the fixed portion 11 have vertical grooves 11a, 11b, 11c and 11d which have a predetermined width, in the center portion in the width direction, from the bottom area of the fixed portion 11 to the top portion thereof. As a result, at the four corners of the four square pillars of the fixed portion 11, the portion excluding the vertical grooves 11a, 11b, 11c and 11d form protruding portions 11ab, 11bc, 11cd and 11da which protrude outward from the corners of the square pillar. In addition, an air bearing surface is formed at each of the 2 adjoining wall surfaces of the protruding portions 11ab, 11bc, 11cd and 11da.

Meanwhile, a magnet 16 comprising a linear motor is mounted at the bottom surface of one vertical groove 11a and another opposing vertical groove 11c of the fixed portion 11. Furthermore, a scale 18 which is a linear position detector is mounted on the bottom surface of another vertical groove 11d, respectively.

On the other hand, as shown in FIG. 2C, a through-hole with a substantially square cross-section through which the fixed portion 11 can be inserted is formed in the movable portion 12. On the two opposing wall surfaces from among the four wall surfaces inside the movable portion 12 which surround the through hole, vertical grooves 12a and 12c having a predetermined width are formed at the center portion thereof in the width direction to extend from the bottom of the movable portion 12 to the top thereof. A coil 15 constituting a linear motor is mounted on the bottom surface of the vertical grooves 12a and 12c so that the coil 15 opposes magnet 16 which is mounted on the fixed portion 11. Furthermore, a detection head 17 is mounted on one wall surface which does not have vertical groove formed inside the movable portion 12 so that the detection head 17 opposes the scale 18 mounted on the fixed portion 11.

Furthermore, at the four corners where a wall surfaces meets another wall surface inside the movable portion 12a, a plurality of air discharge openings 14 such as nozzles through which air is injected toward the inside are formed in the vertical direction.

Thus, as shown in FIG. 2D, the fixed portion 11 is inserted into the through-hole of the movable portion 12 so that the magnet 16 of the fixed portion 11 and the coil 15 of the movable portion 12 oppose each other and the scale 18 of the fixed portion 11 and the detection head 17 of the movable portion 12 oppose each other. In this state, each of the two adjacent surfaces in the projecting portions 11ab, 11bc, 11cd and 11da at the four corners of fixed portion 11 oppose the surface of the movable portion 12 on which the air discharge openings are provided, with the result that these opposing surfaces constitute air bearing surfaces F, thereby forming an air bearing.

As shown in FIG. 2E, the vertical length Hs of the air bearing surface on the side of the fixed portion 11, which corresponds to the vertical length of the fixed portion 11, is longer than the vertical length Hm of the air bearing surface on the side of the movable portion 12, which corresponds to the vertical length of the movable portion 12. As shown in FIG. 2A, the movable portion 12 is connected with an air supply tube for supplying air to the air discharge openings 14, a power line for supplying power to the coil 15, and a cable 19 for signal lines and the like to the detection head 17.

By supplying compressed air using the cable 19 and injecting air onto the air bearing surface F using the air discharge openings 14 of the movable portion 12, the movable portion 12 is supported through air between the movable portion 12 and the fixed portion 11 without coming into contact with the fixed portion 11. In addition, if power is supplied to the coil 15 via the cable 19 to drive the linear motor composed of the magnet 16 on the fixed portion 11 and the coil 15 on the movable portion 12, the movable portion 12 is guided by the air bearing surface F of the fixed portion 11, and thus driven vertically in FIG. 2A. The movement amount of the movable portion 12 with respect to the fixed portion 11 is detected by a linear position detector comprising the scale 18 on the fixed portion 11 and the detection head 17 on the movable portion 12.

As shown above, in the linear drive device using the air bearing of the prior art, because the air discharge openings 14 are provided on the side of the movable portion 12, the supply tube for supplying pressurized air must be connected to the movable portion 12. Furthermore, as described above, cables for a power line and a signal line are also connected to the movable portion.

However, as described above, because in the air bearing, the air is a compressed liquid, the rigidity of the bearing is low. As a result, in prior art, each of cables that are attached to the movable portion 12 is disposed such that curvature of the cable is large enough to prevent a load on the cables. However, the effect of the load due to the cables and the like that are attached to the movable portion can not be disregarded, as the air bearing is influenced in nanometer order.

Furthermore, because the air bearing surface receives a larger force due to the compressed air, the effect on accuracy of the deformation on mechanical structure cannot be disregarded.

SUMMARY OF THE INVENTION

The air bearing structure according to the present invention is the type in which a movable portion moves linearly with respect to a fixed portion, and a plurality of air discharge openings through which air is injected are formed in the bearing surface on the side of the fixed portion, and the fixed portion has a connecting portion for connection with air supply means. Further, the length of the bearing surface on the side of the movable portion in the direction of movement is larger than the length of the bearing surface on the side of the fixed portion side by the stroke of the movement so that the entire area of the bearing surface on the side of the fixed portion always opposes the bearing surface on the side of the movable portion.

The movable portion may have a shape of a box that is open in one direction of movement so that the fixed portion is inserted inside the movable portion.

The linear drive device according to the present invention comprises an air bearing structure in which a movable portion having a bearing surface moves linearly with respect to a fixed portion having a bearing surface. In addition, a plurality of air discharge openings through which air is injected are formed in the bearing surface on the side of the fixed portion, and the fixed portion has a connecting portion for connection with air supply means. Further, the length of the bearing surface on the side of the movable portion in the direction of movement is larger than the length of the bearing surface on the side of the fixed portion side by the stroke of the movement so that the entire area of the bearing surface on the side of the fixed portion always opposes the bearing surface on the side of the movable portion. Also, a coil is disposed on the fixed portion and a magnet is disposed on the movable portion, and this coil and magnet constitute a linear motor.

The movable portion may have a shape of a box that is open in one direction of movement so that the fixed portion is inserted inside the movable portion.

A detection head and a scale may be mounted on the fixed portion and the movable portion, respectively, so that the position of the movable portion is detected by using these detection head and scale.

Wires necessary for driving the linear drive device may be connected only to the fixed portion.

According to the present invention, as described above, a bearing structure which realizes highly accurate linear movement and a linear driving device which includes this type of bearing structure are provided.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1A:
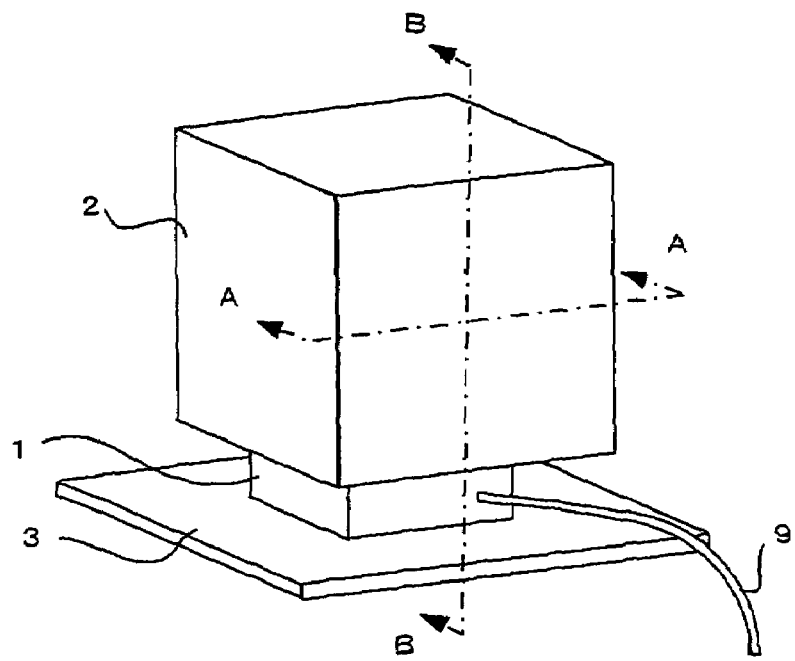
FIG. 1A is perspective view of one embodiment of the linear drive device of this invention.
Figure 1B:
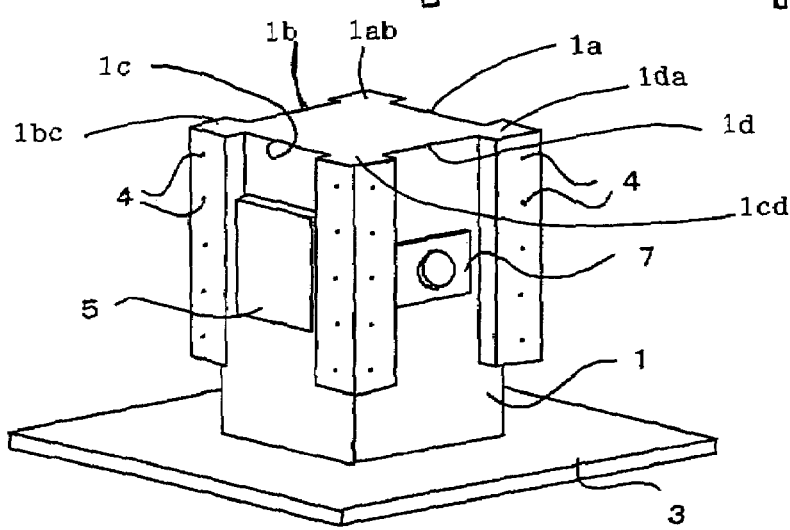
FIG. 1B is a perspective view of the fixed portion of the air bearing used in the linear drive device of FIG. 1A.

The following is a description of the air bearing structure and linear drive device employing the air bearing structure according to one embodiment of the present invention, with reference to FIGS. 1A to 1B.

Figure 2A:
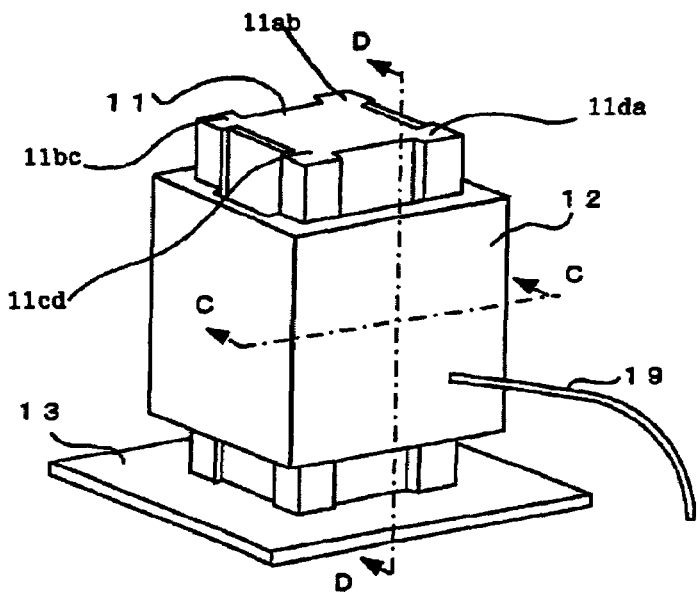
FIG. 2A is a perspective view of a prior art example of the linear drive device in which the movable portion is moved linearly using an air bearing.
Figure 2B:
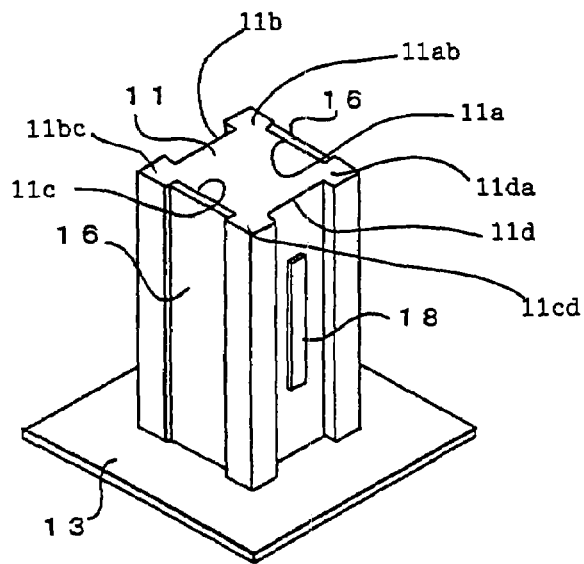
FIG. 2B is a perspective of the fixed portion of the air bearing used in the linear drive device of 2A.
Figure 2C:
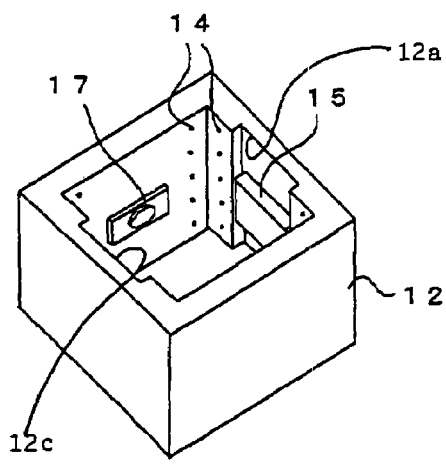
FIG. 2C is a perspective of the movable portion of the air bearing used in the linear drive device of 2A.
Figure 2D:
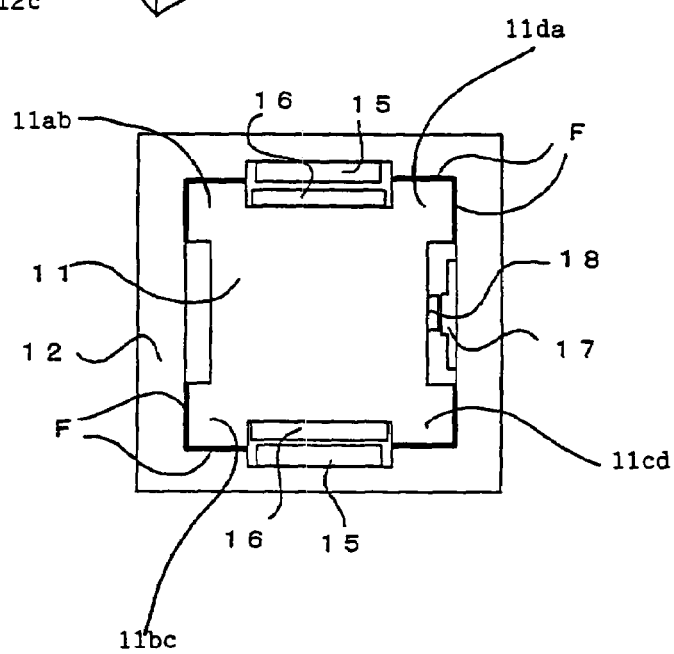
FIG. 2D is a cross-sectional view taken along C-C of FIG. 2A.
Figure 2E:
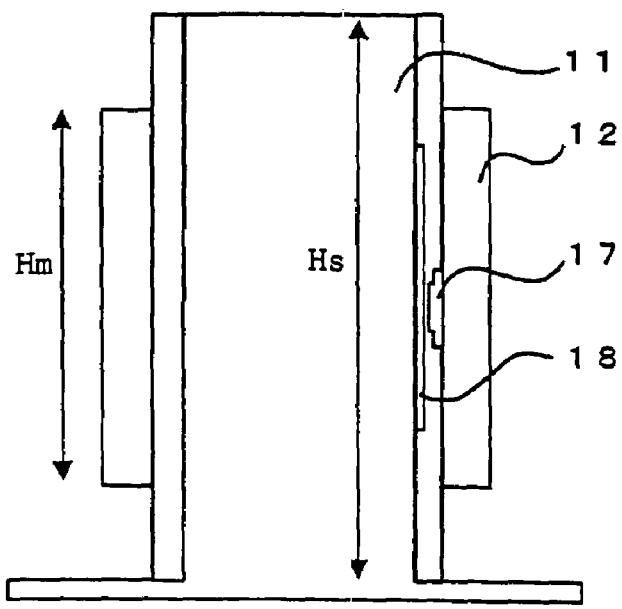
FIG. 2E is a cross-sectional view taken along D-D of FIG. 2A.

As shown in FIG. 1B, a fixed portion 1 is configured as a substantially square pillar and the bottom surface thereof is fixed to the surface of a base 3 and extends upward from the surface of the base 3. Protruding portions 1ab, 1bc, 1cd and 1da, which have substantially the same cross-sectional configuration as the protruding portions 11ab, 11bc, 11cd and 11da shown in FIG. 2B, extend outward from the four corners of the fixed portion 1. However, these protruding portions 1ab, 1bc, 1cd and 1da are not formed at the portion near to the bottom surface of the fixed portion 1; that is, each of these protruding portions 1ab, 1bc, 1cd and 1da is formed in the range from a position at a distance upward from the bottom surface of the fixed portion 1 to the top surface of the fixed portion 1. The two adjacent wall surfaces in each of the protruding portions 1ab, 1bc, 1cd and 1da have a plurality of air discharge openings 4 such as nozzles in the vertical direction, thereby constituting air bearing surfaces.

In addition, a coil 5 which constitutes a linear motor is mounted on the bottom surface of the vertical groove 1a formed between the protruding portions 1ab and 1da and also on the bottom surface of the vertical groove 1c formed between the protruding portions 1cd and 1bc which opposes the vertical groove 1a. Further, a detection head 7 of the linear positioning detector is mounted on the bottom surface of the vertical groove 1d formed between the protruding portions 1cd and 1da.

The structure of the fixed portion 1 and the movable portion 2 shown in FIGS. 1A to 1E differ from the prior art example shown in FIGS. 2A to 2E in which the compressed air discharge openings 14, the coil 15 and the detection head 17 are provided on the side of the movable portion 12, in that compressed air discharge openings 4 are provided on the side of the fixed portion 1 and the coil 5 and the detection head 7 are also provided on the side of the fixed portion 1.

Figure 1C:
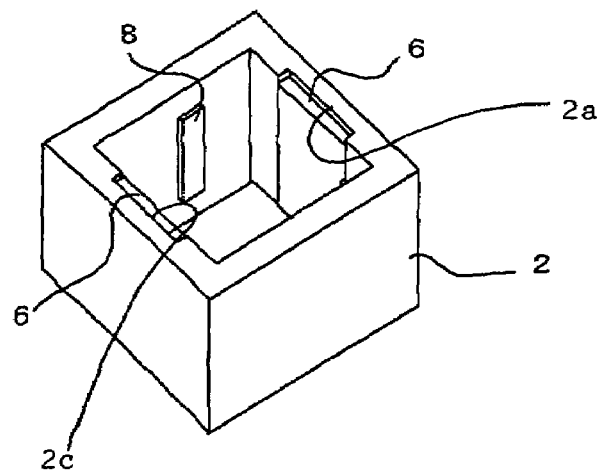
FIG. 1C is a perspective view of the movable portion in the air bearing used in the linear drive device of FIG. 1A.

Meanwhile, as shown in FIG. 1C, the movable portion 2 which engages with the fixed portion 1 has a hole with a bottom, and a substantially square cross-sectional configuration into which the pillar of the fixed portion 1 can be engaged. In other words, the movable portion 2 has a shape of a square box having an opening at the top and a bottom. On the two opposing wall surfaces from among the four wall surfaces inside the movable portion 2 which surround the through hole, vertical grooves 2a and 2c having a predetermined width are formed at the center portion thereof in the width direction to extend from the bottom of the movable portion 2 to the top thereof. Also, a magnet 6 constituting a linear motor is mounted on the vertical grooves 2a and 2c. In addition, a scale 8 is mounted at one wall surface of the movable portion 2 in which there are no vertical grooves 2a and 2c formed, thereby opposing the detection head 7 (FIG. 1B) which is mounted on the fixed portion 1.

Figure 1D:
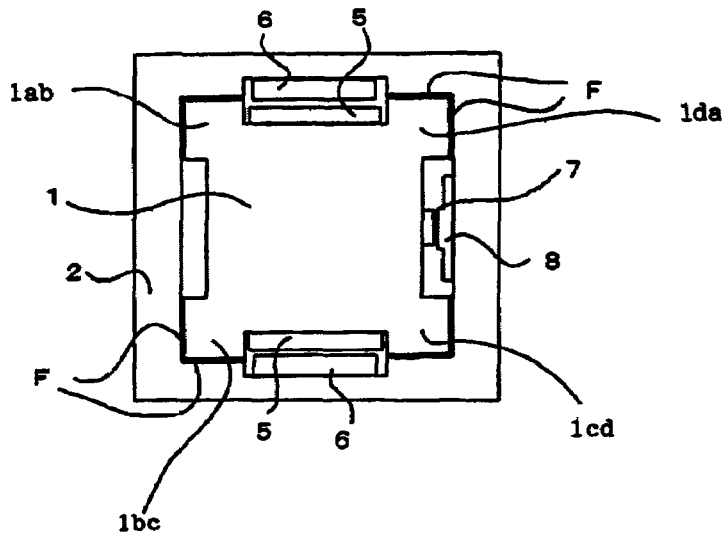
FIG. 1D is a cross-sectional view taken along A-A of FIG. 1A.

Thus, as shown in FIG. 1A, the movable portion 2 is inserted into the hole of the fixed portion 1 through the opening, and as shown in FIG. 1D, the magnet 6 on the movable portion 2 is located so as to oppose the coil 5 on the fixed portion 1, and the scale 8 on the movable portion 2 is located so as to oppose the detection head 7 on the fixed portion 1. In this state, two adjacent wall surfaces in each of the protruding portions 1ab, 1bc, 1cd and 1da at the four corners of the fixed portion 1, in which air discharge openings 4 are provided, oppose the surfaces inside the movable portion 2 at the four corners where one wall surface meets another wall surface, with the result that each of these opposing surfaces constitutes an air bearing surface F, thereby forming an air bearing.

Figure 1E:
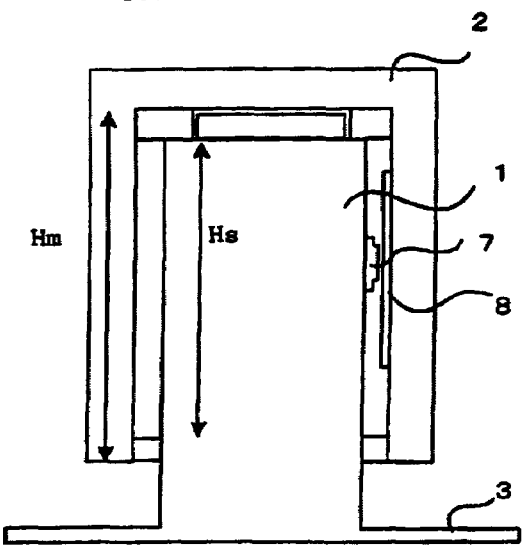
FIG. 1E is a cross-sectional view taken along B-B of FIG. 1A.

As shown in FIG. 1E, the vertical length Hm of the air bearing surface in the movable portion 2, which correspond to the depth of the hole in the movable portion 2, is longer than the vertical length Hs of the air bearing surface in the pillar of the fixed portion 1. In other words, the vertical length (or the length in the moving direction) Hm of the air bearing surface in the movable portion 2 is larger than the sum of the vertical length Hs of the air bearing surface in the fixed portion 1 and the linear movement stroke of the movable portion 2. With this configuration, even when the movable portion 2 is driven and moved the maximum amount along the fixed portion 1, the air bearing surface of the movable portion 2 is never disengaged from the air bearing surface of the fixed portion 1, so that the air bearing surface of the fixed portion 1 always opposes the air bearing surface of the movable portion 2. As shown in FIG. 1A, the fixed portion 1 is connected with an air supply tube for supplying air to the air discharge openings 4, a power line for supplying power to the coil 5, and a cable 9 for signal lines and the like to the detection head 7.

By supplying compressed air using the cable 9 and injecting air onto the air bearing surface Fusing the air discharge openings 4 of the movable portion 2, the movable portion 2 is supported through air between the movable portion 2 and the fixed portion 1 without coming into contact with the fixed portion 1. In addition, if power is supplied to the coil 5 via the cable 9 to drive the linear motor composed of the coil 5 on the movable portion 2 and the magnet 6 on the fixed portion 1, the movable portion 2 is guided by the air bearing surface F of the fixed portion 1, and thus driven vertically in FIG. 1A. The movement amount of the movable portion 2 with respect to the fixed portion 1 is detected by a linear position detector comprising the scale 8 on the fixed portion 11 and the detection head 7 on the movable portion 2.

In the present invention, because the cable 9 for supplying air to be injected onto the air bearing surface F is connected to the fixed portion 1, and not to the movable portion 2, there is no possibility of external force from the cable 9 being exerted on the movable portion 2. Thus, highly accurate positioning of the movable portion 2 is achieved and highly accurate operation is realized. Also, as the movable portion 2 has a shape of a box that has a bottom, the structure of the movable portion 2 can be rigid, so that there is little or no deformation in the movable portion 2 even when a great force due to compressed air is applied.

The invention claimed is:

1. An air bearing structure in which a movable portion moves linearly with respect to a fixed portion, wherein:
   a plurality of air discharge openings through which air is injected are formed in each of the bearing surfaces on the side of the fixed portion, and the fixed portion has a connecting portion for connection with air supply means,
   the length of the bearing surface on the side of the movable portion in the direction of movement is larger than the length of the bearing surface on the side of the fixed portion side by the stroke of the movement so that the entire area of the bearing surface on the side of the fixed portion always opposes the bearing surface on the side of the movable portion, and
   the movable portion has a shape of a box that is open in one direction of movement and the fixed portion is inserted inside the movable potion.

2. A linear drive device comprising an air bearing structure in which a movable portion having a bearing surface moves linearly with respect to a fixed portion having a bearing surface, wherein:
   a plurality of air discharge openings through which air is injected are formed in each of the bearing surfaces on the side of the fixed portion, and the fixed portion has a connecting portion for connection with air supply means;
   the length of the bearing surface on the side of the movable portion in the direction of movement is larger than the length of the bearing surface on the side of the fixed portion side by the stroke of the movement so that the entire area of the bearing surface on the side of the fixed portion always opposes the bearing surface on the side of the movable portion;
   a coil is disposed on the fixed portion and a magnet is disposed on the movable portion, and this coil and magnet constitute a linear motor; and
   the movable portion has a shape of a box that is open in one direction of movement and the fixed portion is inserted inside the movable portion.

3. The linear drive device according to claim 2, wherein a detection head is mounted on the fixed portion and a scale is mounted on the movable portion so that the position of the movable portion is detected by using these detection head and scale.

4. The linear drive device according to claim 2, wherein wires necessary for driving the linear drive device are connected only to the fixed portion.

5. An air bearing structure, comprising:
   a fixed portion; and
   a movable portion that moves linearly with respect to the fixed portion, wherein
   a plurality of air discharge openings through which air is injected are formed in each of the bearing surfaces on the side of the fixed portion, and the fixed portion has a connecting portion for connection with an air supply,
   the length of the bearing surface on the side of the movable portion in the direction of movement is larger than the length of the bearing surface on the side of the fixed portion side by the stroke of the movement so that the entire area of the bearing surface on the side of the fixed portion always opposes the bearing surface on the side of the movable portion, and
   the movable portion has a shape of a box that is open in one direction of movement and the fixed portion is inserted inside the movable portion.

* * * * *

UNITED STATES PATENT AND TRADEMARK OFFICE
CERTIFICATE OF CORRECTION

PATENT NO. : 7,275,870 B2  Page 1 of 1
APPLICATION NO. : 11/188798
DATED : October 2, 2007
INVENTOR(S) : Tomohiko Kawai et al.

It is certified that error appears in the above-identified patent and that said Letters Patent is hereby corrected as shown below:

Column 6, Line 10, change "potion." to --portion.--.

Signed and Sealed this

Twenty-ninth Day of April, 2008

JON W. DUDAS
*Director of the United States Patent and Trademark Office*